No. 685,163. Patented Oct. 22, 1901.
S. MILLER.
MUD GUARD FOR BICYCLES.
(Application filed May 9, 1901.)
(No Model.)
Fig. 1.
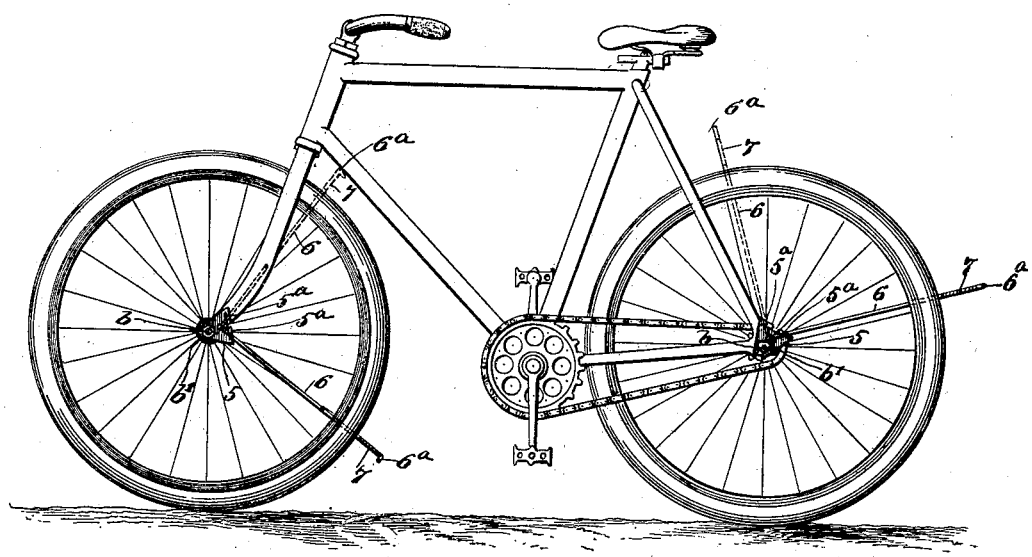
Fig. 2.
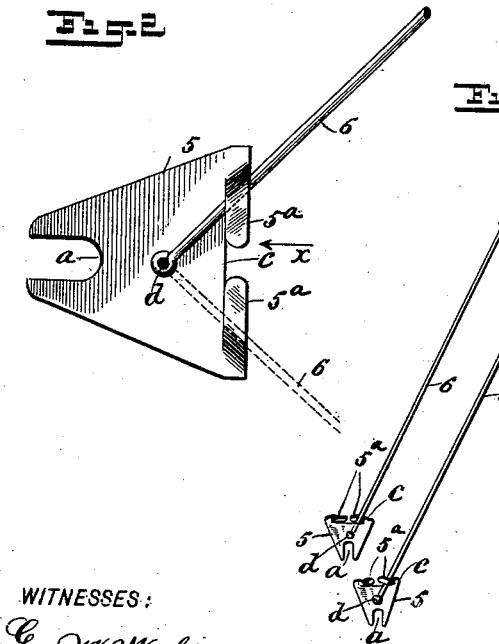
Fig. 4.
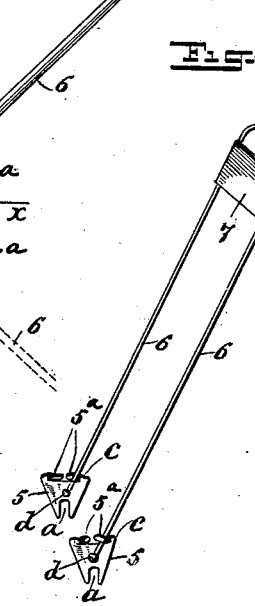
Fig. 3.
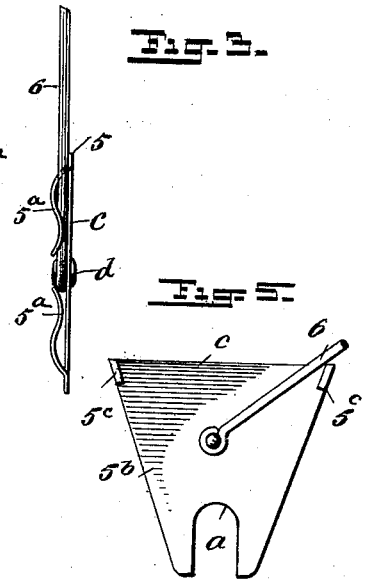
Fig. 5.
WITNESSES:
Geo. W. Naylor
Wm. P. Patton
INVENTOR
Spencer Miller
BY Munn
ATTORNEYS
THE NORRIS PETERS CO., PHOTO-LITHO., WASHINGTON, D. C.

UNITED STATES PATENT OFFICE.

SPENCER MILLER, OF ROCHESTER, NEW YORK.

MUD-GUARD FOR BICYCLES.

SPECIFICATION forming part of Letters Patent No. 685,163, dated October 22, 1901.

Application filed May 9, 1901. Serial No. 59,409. (No model.)

*To all whom it may concern:*

Be it known that I, SPENCER MILLER, a citizen of the United States, and a resident of Rochester, in the county of Monroe and State of New York, have invented a new and Improved Mud-Guard for Bicycles, of which the following is a full, clear, and exact description.

The object of this invention is to provide an attachable mud-guard for a bicycle, which may be readily applied or removed and which is adapted for rocking adjustment, so as to reliably hold the guard in lowered position for service or in an elevated position when not needed for use as a mud-guard.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a side view of a bicycle and of the improvement applied thereon, the changes of adjustment being indicated by full and dotted lines. Fig. 2 is a detached and enlarged side view of a novel bracket-plate and one arm of the mud-guard pivoted thereon to receive rocking adjustment. Fig. 3 is an edge view of the bracket-plate and the arm pivoted thereon seen in direction of the arrow $x$ in Fig. 2. Fig. 4 is a perspective view of the improved mud-guard detached from the bicycle, and Fig. 5 is a side view of a modified form of the bracket-plate.

The improvement is designed for application to both wheels of a bicycle to prevent mud which may stick to the tire from being thrown upon the rider of the vehicle while moving rapidly over a muddy road-bed. As the devices for each wheel of the bicycle are similar in construction, a description of one mud-guard will answer for both.

An essential feature of the improvement consists in the provision of duplicate bracket-plates 5, which serve as a means for reliably connecting the mud-guard proper with an axle of the traction-wheel upon which said mud-guard is applied. Each bracket-plate 5 may be substantially triangular in marginal form, as shown in Fig. 2, and for effective service is preferably constructed of resilient metal in plate form. At one corner of each bracket-plate 5 an open slot $a$ is formed, wherein the axle $b$ of the bicycle-wheel may be slidably introduced, and the duplicate plates which thus respectively engage the axle near its opposite ends may be thereon clamped by nuts $b'$, which screw upon threaded ends of the axle. The edge $c$ of each bracket-plate 5 or $5^b$, which lies opposite the slotted corner $a$, may have finger-springs $5^a$ formed thereon or may simply have the projections $5^c$ at the upper corners of the bracket-plate. When the springs $5^a$ are employed, they are usually formed integral with the bracket-plate and project toward each other, their free ends being suitably spaced apart, and for efficiency in use said springs are bowed somewhat near their centers of length.

The mud-guard proper comprises a pair of rod-like arms 6 6, which are preferably held spaced apart in parallel planes by a cross-bar $6^a$, integral therewith. A scraper-blade 7, of suitable material, is held slidably on the arms 6, near the cross-bar $6^a$, by any suitable means, so that said blade may be adjusted toward a bicycle-tire when the device is being arranged for service, as will be described.

The ends of the arms opposite the cross-bar $6^a$ are respectively pivoted, as at $d$, upon one of the bracket-plates 5 at or near its center, said arms being disposed along the outer surfaces of the bracket-plates and project across the edges $c$ of said bracket-plates, so as to be adapted for engagement with either finger-spring $5^a$ on each plate, as indicated by full and dotted lines in Fig. 2.

In order to protect the person of the rider of a bicycle having the improvement, the mud-guard on the front wheel is positioned so as to incline the arms 6 rearwardly and downwardly, as shown by full lines in Fig. 1. This will locate the scraper-blade 7 a short distance above the ground and effectively prevent dirt from the tire of the wheel being thrown upward and rearward in direction of the rider.

The rearward and downward inclination of the arms 6 6, as explained, is maintained at a proper angle by the hooked engagement of said arms with the lower finger-springs $5^a$ on the bracket-plates 5, as represented by full lines in Fig. 1 and in dotted lines in Fig. 3. The bowed portions of said spring members 5ª receive the bodies of the arms and hold them from accidental displacement, but in a manner which will allow their removal by manual lifting action, which will dispose the arms beneath the upper finger-springs, that in a like manner will hold the arms and scraper-blade in the upwardly and rearwardly inclined position represented by dotted lines in Fig. 1, this adjustment being effected when the mud-guard is not required for protection of the wheelman.

As the rear wheel of the bicycle is liable to throw mud toward the rider from the rising rear portion of the periphery of said wheel, the improved mud-guard must be arranged as shown at the right in Fig. 1, where it will be seen that the bracket-plates 5 are so disposed on the axle of the rear wheel as to hold the arms extended rearwardly nearly in a horizontal plane, said arms then hooking beneath an appropriate pair of spring-fingers 5ª, that retain the arms in position for proper service of the guard plate or scraper 7.

When the mud-guard is not required for use on the rear wheel, its adjustment may be readily changed by rocking the arms 6 upward, which will disengage them from the lower pair of finger-springs 5ª and introduce said arms beneath the upper pair of finger-springs 5ª, which will dispose the mud-guard in an upright position, so that it will be located near and below the saddle of the bicycle, as indicated by dotted lines in Fig. 1.

If the bracket-plates are constructed without the springs 5ª and are provided with the outward projections 5ᶜ at their upper corners, as shown in Fig. 5, said projections will serve to arrest the arms 6 and support the mud-guard at a desired point of adjustment, the arms being clamped upon the plates 5, so as to produce sufficient frictional resistance to prevent an accidental rocking movement of the mud-guard while the bicycle is in motion.

Having thus described my invention, I claim as new and desire to secure by Letters Patent—

1. A mud-guard for bicycles, comprising a pair of arms, and two bracket-plates, to about the center of which the arms are pivoted, each plate being provided with an opening to receive an axle and at the edge opposite the opening with two space projections, which serve as stops to limit the swinging movement of said arms and hold them in the two positions into which they are adapted to be swung.

2. A mud-guard for a bicycle, comprising two securable bracket-plates, two finger-springs on each bracket-plate, a pair of arms held to rock on the bracket-plates so as to engage with a like finger-spring on each plate, and a guard-plate carried by the arms.

3. A mud-guard for a bicycle, comprising two bracket-plates, each having an opening for engagement therewith of one end of an axle, two spring-fingers on each bracket-plate, positioned at the same edge of the plate and extending toward each other, two arms each pivoted by one end upon the respective bracket-plates, and a transverse scraper or guard-plate held on the arms near their outer ends.

4. A mud-guard for a bicycle, comprising two substantially triangular bracket-plates, each having an open slot in one corner, and two bowed finger-springs at the edge of the plate opposite the slot, two arms held spaced apart by a cross-bar, like ends of said arms having pivoted engagement with respective bracket-plates, said arms being adapted to hook beneath either pair of the finger-springs and thus be held from rocking, and a guard or scraper held adjustably on the arms near the cross-bar.

5. In a device of the character described, the pair of bracket-plates for removably securing the mud-guard upon an axle of a bicycle, each plate consisting of a substantially triangular plate, slotted inwardly at one corner, and two bowed finger-springs extending their free ends toward each other and positioned at the edge of the bracket-plate which is opposite the slotted corner of the bracket-plate.

In testimony whereof I have signed my name to this specification in the presence of two subscribing witnesses.

SPENCER MILLER.

Witnesses:
 NICK M. SECHANDES,
 JOHN E. O'CONNOR.